(12) United States Patent
Haeberer

(10) Patent No.: US 10,507,722 B2
(45) Date of Patent: Dec. 17, 2019

(54) CONTAINER ASSEMBLY FOR A MOTOR VEHICLE

(71) Applicant: Robert Bosch GmbH, Stuttgart (DE)

(72) Inventor: Rainer Haeberer, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 15/489,997

(22) Filed: Apr. 18, 2017

(65) Prior Publication Data

US 2017/0305264 A1 Oct. 26, 2017

(30) Foreign Application Priority Data

Apr. 20, 2016 (DE) .................. 10 2016 206 637

(51) Int. Cl.
*B60K 15/03* (2006.01)
*F01N 3/28* (2006.01)

(52) U.S. Cl.
CPC ............ *B60K 15/03* (2013.01); *F01N 3/2896* (2013.01); *B60K 2015/03105* (2013.01); *B60K 2015/03348* (2013.01); *F01N 2610/02* (2013.01); *F01N 2610/10* (2013.01); *F01N 2610/1406* (2013.01)

(58) Field of Classification Search
CPC .......... B60K 15/03; B60K 2015/03105; F01N 3/2896; F01N 2015/03105; F01N 2610/02; F01N 2610/10; F01N 2610/1406; F02M 37/0082; F02M 37/0088; F02B 11/02
See application file for complete search history.

(56) References Cited

U.S. PATENT DOCUMENTS

| | | | | |
|---|---|---|---|---|
| 6,223,526 B1* | 5/2001 | Wissler | ................. | B60K 15/03 60/286 |
| 2011/0232271 A1* | 9/2011 | Haeberer | .............. | F01N 3/2066 60/295 |
| 2011/0272414 A1* | 11/2011 | Gaden | .................... | B60K 13/04 220/564 |
| 2013/0240055 A1* | 9/2013 | Zanek | ................... | F01N 3/2066 137/334 |
| 2013/0292386 A1* | 11/2013 | Klauer | ................... | B60K 13/04 220/553 |
| 2017/0328255 A1* | 11/2017 | Maguin | ................. | F01N 3/2066 |

FOREIGN PATENT DOCUMENTS

| | | |
|---|---|---|
| DE | 102009000094 | 7/2010 |
| DE | 102009009676 | 8/2010 |
| DE | 102009009676 A1 * | 8/2010 |
| EP | 2846013 A1 * | 3/2015 |

* cited by examiner

*Primary Examiner* — Patrick D Maines
(74) *Attorney, Agent, or Firm* — Michael Best & Friedrich LLP

(57) ABSTRACT

A container assembly for a motor vehicle comprises a first container (20) for a fuel for the motor vehicle and a second container (10) for a liquid auxiliary agent, in particular for the reducing agent solution of an SCR catalyst. The second container (10) is integrated into the first container (20). A bottom-mounted removal device having at least one pump (11) for removing the auxiliary agent is provided in the second container (10).

22 Claims, 3 Drawing Sheets

CONTAINER ASSEMBLY FOR A MOTOR VEHICLE

BACKGROUND OF THE INVENTION

The present invention relates to a container assembly for a motor vehicle, having a first container for a fuel and a second container for a liquid auxiliary agent. In this assembly, the second container is integrated into the first container.

SCR catalysts (Selective Catalytic Reduction) are known for reducing the content of nitrogen oxides in the exhaust gas from an internal combustion engine. In an SCR catalyst, the nitrogen oxides in the exhaust gas are reduced to elementary nitrogen and water in the presence of a reducing agent. Ammonia (NH3) is used as the reducing agent. To supply ammonia, use is generally made of an aqueous urea solution, which is injected into the exhaust line upstream of the SCR catalyst. To supply the aqueous urea solution, i.e. the reducing agent solution, a tank is provided, this being filled in a workshop in the course of a service, for example. In general, a tank volume of 15 to 30 liters is required. In principle, the volume of the tank for the reducing agent solution can also be reduced, especially if the driver himself can fill the tank outside of a service.

At low temperatures, the reducing agent solution freezes. The freezing point of the often-used solution AdBlue® is about −11° C., for example. One or more heating devices are therefore generally provided for the reducing agent tank in order to thaw the solution at low outside temperatures and to enable the metering system for the reducing agent solution to be made ready for metering.

There is already a known practice of combining the fuel tank of a motor vehicle with a tank for the liquid reducing agent. German Laid-Open Application DE 10 2009 000 094 A1, for example, describes a tank for holding an aqueous solution, wherein the tank is a standard tank which is integrated into a vehicle-specific component, in particular into the fuel tank of the vehicle. German Laid-Open Application DE 10 2009 009 676 A1 also describes the combination of a reducing agent tank with a fuel tank. Owing to the spatial proximity of the reducing agent tank and of the fuel container, freezing of the reducing agent in the reducing agent tank takes place only at a relatively late stage, even at low temperatures.

SUMMARY OF THE INVENTION

The invention provides a container assembly for a motor vehicle, which comprises a first container for a fuel (fuel tank) and a second container for a liquid auxiliary agent. The second container is integrated into the first container. In this assembly, the second container can be arranged within the second container, for example. Moreover, it is also possible for the second container to be arranged or molded on directly adjacent to the first container and, in this case, to be at least partially outside the first container. Integration of the second container into the first container should therefore also be understood to mean that the second container can be arranged laterally on the first container, for example, and that the two containers are geometrically combined. According to the invention, a bottom-mounted removal device having at least one pump for the auxiliary agent is provided in the second container. The liquid auxiliary agent is, in particular, the reducing agent solution for an SCR catalyst of the motor vehicle. The second container can also be provided for storing other auxiliary agents, e.g. for storing windscreen washing liquid or similar. Owing to the fact that the auxiliary agent solution freezes at low outside temperatures, at −11° C. in the case of a reducing agent solution (e.g. AdBlue®), for example, the auxiliary agent volume expands by about 10% at the phase transition. As a result, there may be ice pressure damage affecting, in particular, the components at the top of the reducing agent container since the expansion takes place especially in this direction. Here, the assembly according to the invention has the advantage that, by virtue of combination with or integration into the fuel tank, those components of the auxiliary agent container which are sensitive to ice pressure are in spatial proximity to warm fuel, which is close to the bottom of the fuel container owing to gravity and hence in spatial proximity to the bottom-mounted removal device of the auxiliary agent container. Moreover, the bottom-mounted arrangement of the removal device can be implemented independently of the shape of the tank. Thus, by means of the removal device, which, according to the invention, is arranged at the bottom and which is sensitive to ice pressure in principle, it is ensured that freezing becomes unlikely owing to the spatial proximity to the warm fuel.

In a preferred embodiment of the container assembly according to the invention, a delivery module comprising the at least one pump is provided for removing the liquid auxiliary agent from the second container, wherein this delivery module is preferably integrated into the second container at the bottom. In the case of integration of the second container into the first container, it is of particular advantage to provide for the delivery module, which is arranged on a plate for example, to be integrated at the bottom into the first container in such a way that it forms the bottom of the second container. In this case, the delivery module can have not only the pump but also a removal line and preferably a level sensor and/or a pressure sensor. Moreover, at least one filter, which is situated on the suction side and/or discharge side of the pump, is preferably provided. In addition, one or more heating devices can be provided, allowing the auxiliary agent solution to be thawed where appropriate.

A respective feed device (feed line) is provided on the first container and on the second container to enable the fuel or the liquid auxiliary agent, e.g. the reducing agent solution, to be introduced into the respective container. In a particularly preferred embodiment of the container assembly according to the invention, the feed device of the first container and the feed device of the second container are arranged adjacent to one another. In a preferred embodiment, a return line for fuel, in particular for heated fuel, opens into the feed device of the first container. This has the particular advantage that introducing heated fuel also heats the adjacent feed device for the second container (auxiliary agent container). It is thereby possible to accelerate the thawing process that may be required for the liquid auxiliary agent in the feed device and in the second container, thus making it possible to relieve the load on possibly electrically driven heating devices for the auxiliary agent container.

The feed device of the first container and the feed device of the second container can each be provided at the top of the containers. This embodiment is particularly advantageous since, in this case, the feed devices are very readily accessible, thus allowing the fuel or the liquid auxiliary agent to be replenished without problems.

In another preferred embodiment, the first container and the second container have at least one common wall. This embodiment is suitable particularly for embodiments in which the second container is integrated into the interior of the first container. It is thereby possible to save material in the production of the containers, this being advantageous in respect of reducing weight, for example. In other embodiments, the first container and the second container can each have an entirely separate wall structure, thereby providing advantages for assembly in some circumstances. For example, the fuel tank (first container) and the tank for the auxiliary agent (second container) can be manufactured separately, wherein the fuel tank has a suitable lateral recess for the geometrical fitting of the auxiliary agent tank, into which the auxiliary agent tank can be inserted.

BRIEF DESCRIPTION OF THE DRAWINGS

Further features and advantages of the container assembly according to the invention will become apparent from the following description of the drawings in conjunction with the dependent claims. Here, the individual features can each be implemented separately or in combination.

In the drawings.

DETAILED DESCRIPTION

Figure 1:
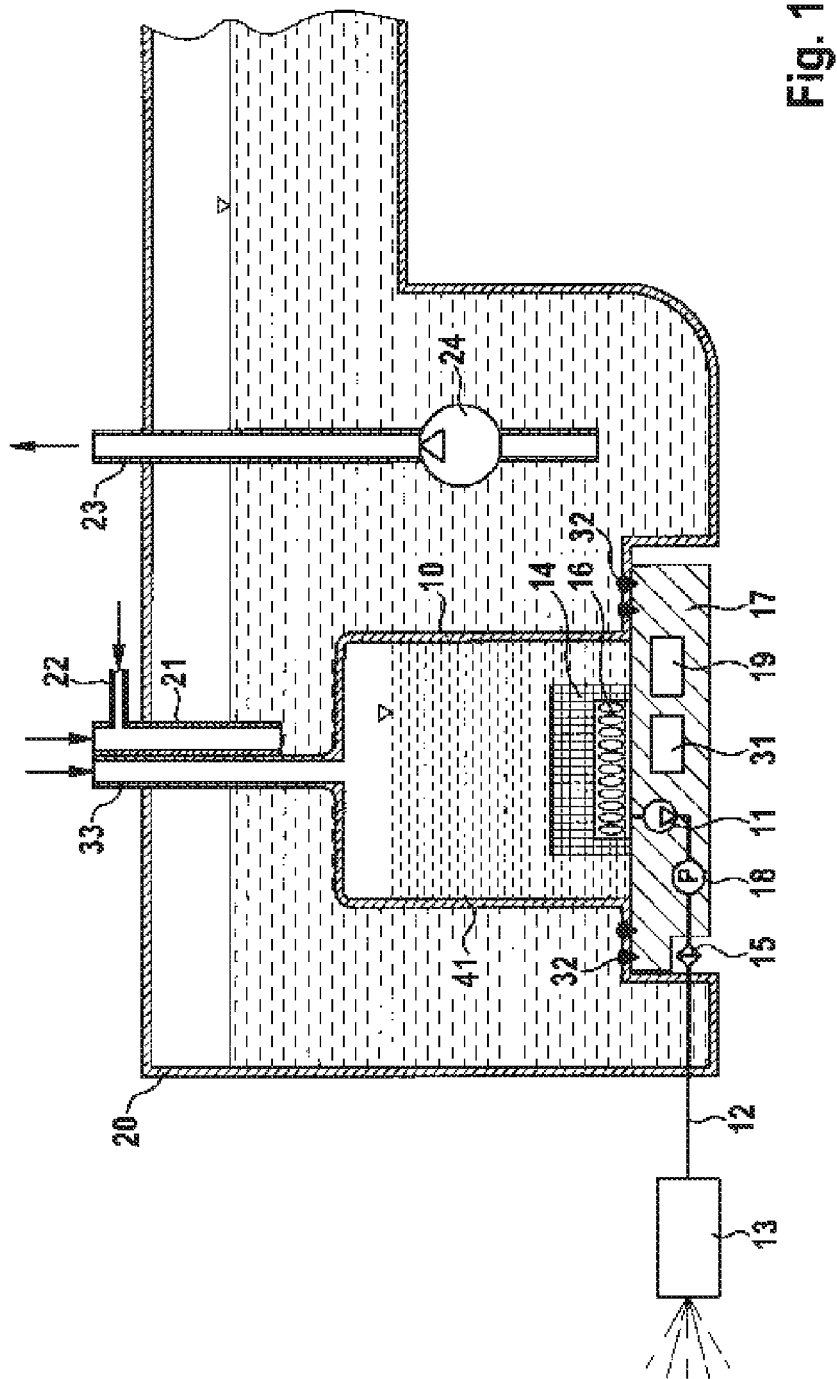
FIG. 1 shows a schematic illustration of a fuel container having an integrated auxiliary agent container according to a first embodiment of the invention.

FIG. 1 illustrates in a schematic way a container assembly according to the invention for a motor vehicle, in which a container 10 for a liquid auxiliary agent, in particular for the reducing agent solution of an SCR catalyst, is integrated into a container 20 for a fuel of the motor vehicle. The auxiliary agent container 10 is arranged in the interior of the fuel container 20. In the sense according to the above description, the container 10 for the auxiliary agent is the second container and the container 20 for the fuel is the first container. The fuel is removed from the container 20 via the removal line 23, which is operated via a pump 24. Thus, the fuel is removed at the top. According to the invention, a removal device for the auxiliary agent is provided at the bottom of the auxiliary agent container 10, wherein the essential element of the removal device is a pump (delivery pump) 11. The delivery pump 11 delivers the auxiliary agent from the container 10 to a metering module 13 via a supply line 12. By means of the metering module 13, the reducing agent solution for an SCR catalyst, for example, can be injected into the exhaust line (not shown here) of the internal combustion engine of the motor vehicle in a manner dependent on requirements. During the removal of the auxiliary agent from the container 10, the solution is filtered. For this purpose, a suction-side filter 14 and/or a pressure-side filter 15 can be provided. A heating device 16 is furthermore provided to enable the reducing agent to be thawed where applicable. The filter 14, the heater 16 and the delivery pump 11 are combined in a functional unit as a "delivery module", wherein these elements are arranged on a plate 17. The delivery module can furthermore comprise a level sensor 19 and, if appropriate, a control unit 31. A pressure sensor 18 can be provided in the region of the supply line 12. In this embodiment, the plate 17 together with the components of the delivery module is integrated at the bottom into the auxiliary agent container 10 inasmuch as the plate 17 is secured on the lower wall of the container assembly by means of material joints 32, in particular by means of welds.

By virtue of the arrangement of the removal device for the auxiliary agent in the form of a bottom-mounted delivery module, the sensitive components (e.g. connections, valves) of this system are situated on the underside of the container 10. Since the auxiliary agent is susceptible to freezing, there can be ice pressure due to the expansion of the volume in the auxiliary agent container 10 at suitably low temperatures. This ice pressure takes effect especially in the upper region of the container 10, and therefore those components of the delivery module or of the removal device which are arranged in the lower region are protected from the ice pressure.

In the embodiment shown in FIG. 1, the auxiliary agent container 10 is integrated into the interior of the container 20 for the fuel, wherein a common wall 41 is provided for both containers. The components of the removal device, which are combined into a delivery module on the plate 17, are situated within appropriate recesses in the lower region of the container 20.

The container 10 is filled with the liquid auxiliary agent from above via a feed device 33. Here, the feed device 33 is in the form of an access line, which runs in the interior or in a lateral recess of the container 20. The container 20 is filled with fuel via a feed device 21, which is situated in immediate spatial proximity to the feed device 33 of the auxiliary agent container 10. A return line 22 for fuel, in particular for heated fuel from the fuel injection system, opens into the feed device 21. By virtue of the adjacent position, this has the particular advantage that the feed device 33 and also the auxiliary container 10 itself are thereby also heated, and therefore any thawing of the auxiliary agent in the container 10 which may be necessary in some circumstances is accelerated and assisted.

Those components of the delivery module which are shown in this embodiment and the arrangement of the containers are to be taken as illustrative. The individual components of the delivery module or of the removal device and the container assembly can also be embodied differently and combined in some other way with one another. The important factor for the invention is that the components of the removal device for the auxiliary agent container are arranged at the bottom.

Figure 2:
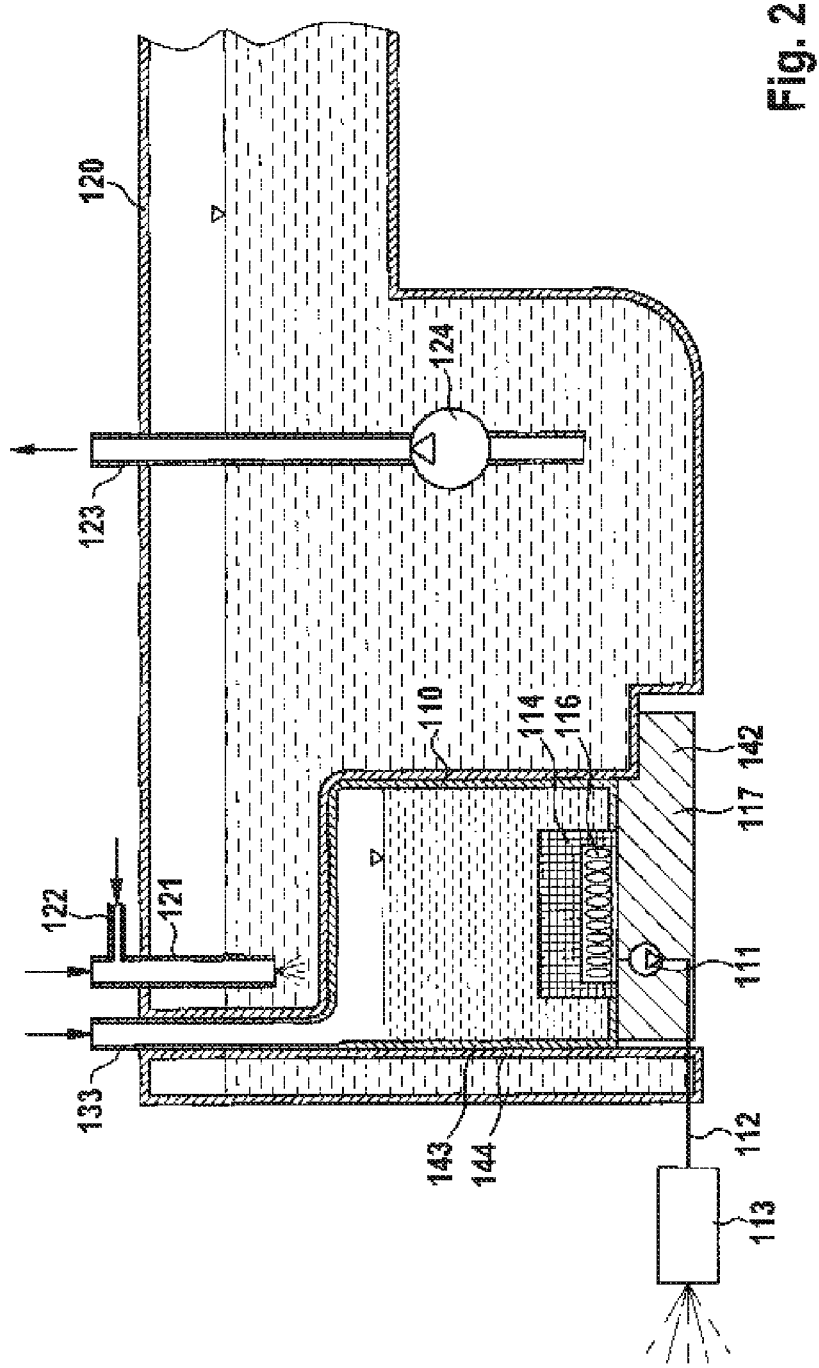
FIG. 2 shows a schematic illustration of a fuel container having an integrated auxiliary agent container according to another embodiment of the invention.

FIG. 2 illustrates another example of a container assembly according to the invention, having a first container 120 for the fuel of a motor vehicle and a second container 110 for a liquid auxiliary agent, wherein, in this embodiment, the container 110 for the auxiliary agent is molded onto the side of the container 120 for the fuel or is situated in a corresponding recess in the fuel container 120. In a manner similar to the embodiment explained with reference to FIG. 1, the container 120 for the fuel comprises a feed line 121 for the fuel, into which a return line 122 for warm fuel from the fuel injection system opens. The fuel is removed from the container 120 via the removal line 123 using a pump 124. The feed line 133 for the auxiliary agent container 110 is likewise situated at the top in immediate proximity to the feed line 121 for the fuel container 120. In the bottom region of the auxiliary agent container 110 there is a plate 117, which carries the components for removing the auxiliary agent from the container 110, in particular a delivery pump 111, a filter 114 and a heating device 116. In a manner similar to the illustration in FIG. 1, the removal device (delivery module) can contain further components, but these are not illustrated here for the sake of clarity. By means of the delivery pump 111, the auxiliary agent, e.g. the reducing agent solution for an SCR system, is removed from the tank 110 and transferred via a supply line 112 to a metering module 113, thus allowing the auxiliary agent to be metered for the respective purpose. Unlike the embodiment explained with reference to FIG. 1, separate walls 144, 143 of the first container 120 and of the second container 110 are provided in the embodiment illustrated in FIG. 2. During assembly, the second container 110 can be inserted to a certain extent into the first container. The plate 117 which carries the elements of the removal device for the auxiliary agent forms the bottom of the container 110. The container 110 is likewise secured on the fuel container 120 by means of the plate 117 in a projecting region 142 of the plate 117, e.g. by welding.

Figure 3:
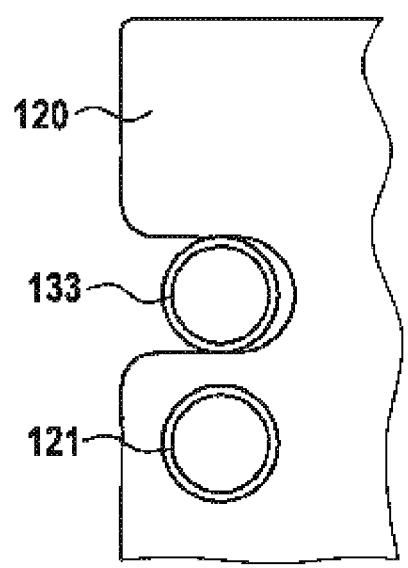
FIG. 3 shows a plan view of a fuel container having an integrated auxiliary agent container according to the invention in the region of the feed devices for fuel and auxiliary agent.

FIG. 3 shows a plan view of the region of the feed lines 133 and 121 of the embodiment of the container assembly illustrated in FIG. 2. It shows the upper side of the container 120, which is penetrated by the feed line 121 for the fuel container 120. In the lateral region of the container 120 there is a channel-shaped recess, into which the feed line 133 for the auxiliary agent container 110 is inserted.

What is claimed is:

1. A container assembly for a motor vehicle, the container assembly comprising a first container (20; 120; 220) for a fuel and a second container (10; 110) for a liquid auxiliary agent, wherein the second container (10; 110) is integrated into the first container (20; 120; 220), wherein a bottom-mounted removal device having at least one pump (11; 111) for the auxiliary agent is provided in the second container (10; 110), and wherein the container assembly further includes a lower wall extending outwardly from the second container (10; 110), the removal device being secured to the lower wall at opposite sides of the second container (10; 110).

2. The container assembly according to claim 1, characterized in that the liquid auxiliary agent is a reducing agent solution for an SCR catalyst of the motor vehicle.

3. The container assembly according to claim 1, characterized in that the removal device of the second container (10; 110) is a delivery module.

4. The container assembly according to claim 3, wherein the delivery module is integrated into the second container (10; 110) at the bottom.

5. The container assembly according to claim 1, characterized in that a respective feed device (21, 33; 121, 133; 221, 233) is provided on the first container (20; 120; 220) and on the second container (10; 110), wherein the feed device (21; 121; 221) of the first container (20; 120; 220) and the feed device (33; 133; 233) of the second container (10; 110) are arranged adjacent to one another.

6. The container assembly according to claim 5, characterized in that a return line (22; 122) for fuel opens into the feed device (21; 121; 221) of the first container (20; 120; 220).

7. The container assembly according to claim 5, characterized in that a return line (22; 122) for heated fuel opens into the feed device (21; 121; 221) of the first container (20; 120; 220).

8. The container assembly according to claim 5, characterized in that the feed device (21; 121; 221) of the first container (20; 120; 220) and the feed device (33; 133; 233) of the second container (10; 110) are each provided at the top of the respective container.

9. The container assembly according to claim 1, characterized in that the first container (10) and the second container (20) have at least one common wall (41).

10. The container assembly according to claim 1, wherein the removal device is situated within a recess in a lower region of the first container.

11. A container assembly for a motor vehicle, the container assembly comprising a first container (20; 120; 220) for a fuel and a second container (10; 110) for a liquid auxiliary agent, wherein the second container (10; 110) is in an interior of the first container (20; 120; 220), wherein a removal device for removing the auxiliary agent from the second container is provided at a bottom of the second container (10; 110), the removal device having at least one pump (11; 111), and wherein the container assembly further includes a lower wall extending outwardly from the second container (10; 110), the removal device being secured to the lower wall at opposite sides of the second container (10; 110).

12. The container assembly according to claim 11, characterized in that the liquid auxiliary agent is a reducing agent solution for an SCR catalyst of the motor vehicle.

13. The container assembly according to claim 11, characterized in that the removal device is a delivery module.

14. The container assembly according to claim 13, wherein the delivery module is integrated into the second container (10; 110) at the bottom.

15. The container assembly according to claim 11, characterized in that a respective feed device (21, 33; 121, 133; 221, 233) is provided on the first container (20; 120; 220) and on the second container (10; 110), wherein the feed device (21; 121; 221) of the first container (20; 120; 220) and the feed device (33; 133; 233) of the second container (10; 110) are arranged adjacent to one another.

16. The container assembly according to claim 15, characterized in that a return line (22; 122) for fuel opens into the feed device (21; 121; 221) of the first container (20; 120; 220).

17. The container assembly according to claim 15, characterized in that a return line (22; 122) for heated fuel opens into the feed device (21; 121; 221) of the first container (20; 120; 220).

18. The container assembly according to claim 15, characterized in that the feed device (21; 121; 221) of the first container (20; 120; 220) and the feed device (33; 133; 233) of the second container (10; 110) are each provided at the top of the respective container.

19. The container assembly according to claim 11, characterized in that the first container (10) and the second container (20) have at least one common wall (41).

20. The container assembly according to claim 11, wherein the removal device is situated within a recess in a lower region of the first container.

21. The container assembly according to claim 1, wherein the removal device is welded to the lower wall at opposite sides of the second container (10; 110).

22. The container assembly according to claim 11, wherein the removal device is welded to the lower wall at opposite sides of the second container (10; 110).

* * * * *